United States Patent [19]
Hellon

[11] Patent Number: 5,503,374
[45] Date of Patent: Apr. 2, 1996

[54] SELF-ADJUSTING SHIM

[75] Inventor: Keith Hellon, Libertyville, Ill.

[73] Assignee: Maclean-Fogg Company, Mundelein, Ill.

[21] Appl. No.: 248,695

[22] Filed: May 25, 1994

[51] Int. Cl.⁶ .................................................. F16F 1/387
[52] U.S. Cl. .......................... 267/281; 403/14; 403/299
[58] Field of Search ............................ 267/281, 282, 267/289, 280, 154; 403/359, 368, 370, 298, 299, 113, 14

[56] References Cited

U.S. PATENT DOCUMENTS

| 4,762,310 | 8/1988 | Krajewski et al. | 267/281 |
| 4,892,430 | 1/1990 | Liska et al. | 403/14 |
| 4,893,426 | 1/1990 | Bixler | 403/299 |

Primary Examiner—Matthew C. Graham
Attorney, Agent, or Firm—Willian Brinks Hofer Gilson & Lione

[57] ABSTRACT

A self-adjusting shim includes an inner element and an outer element. The outer element defines an internal threaded bore and a projecting tab that limits rotation of the outer element. The inner element includes a threaded outer surface and an inner opening. The threaded outer surface is received in the threaded internal bore such that relative rotation between the inner and outer element results in relative axial movement therebetween. The inner opening includes a torque transmitting feature such as an out-of-round surface or an internally projecting element that is directed radially inwardly so as to couple the inner element to a bolt for rotation.

21 Claims, 4 Drawing Sheets

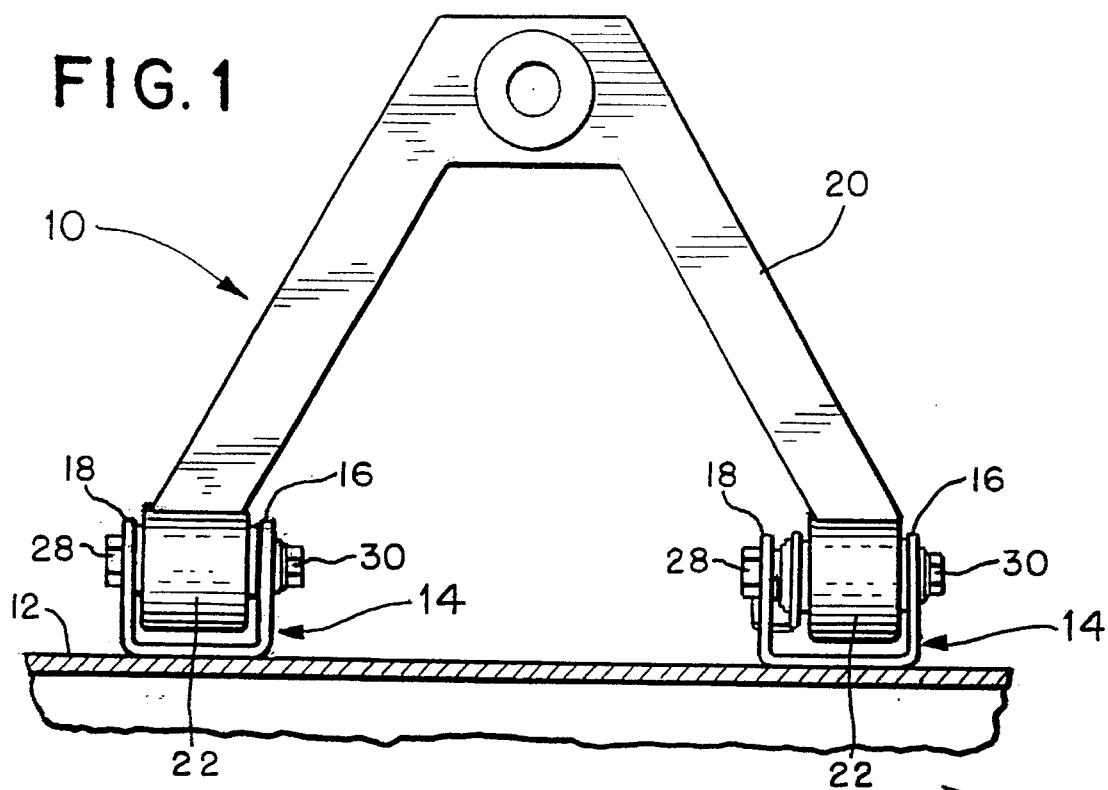
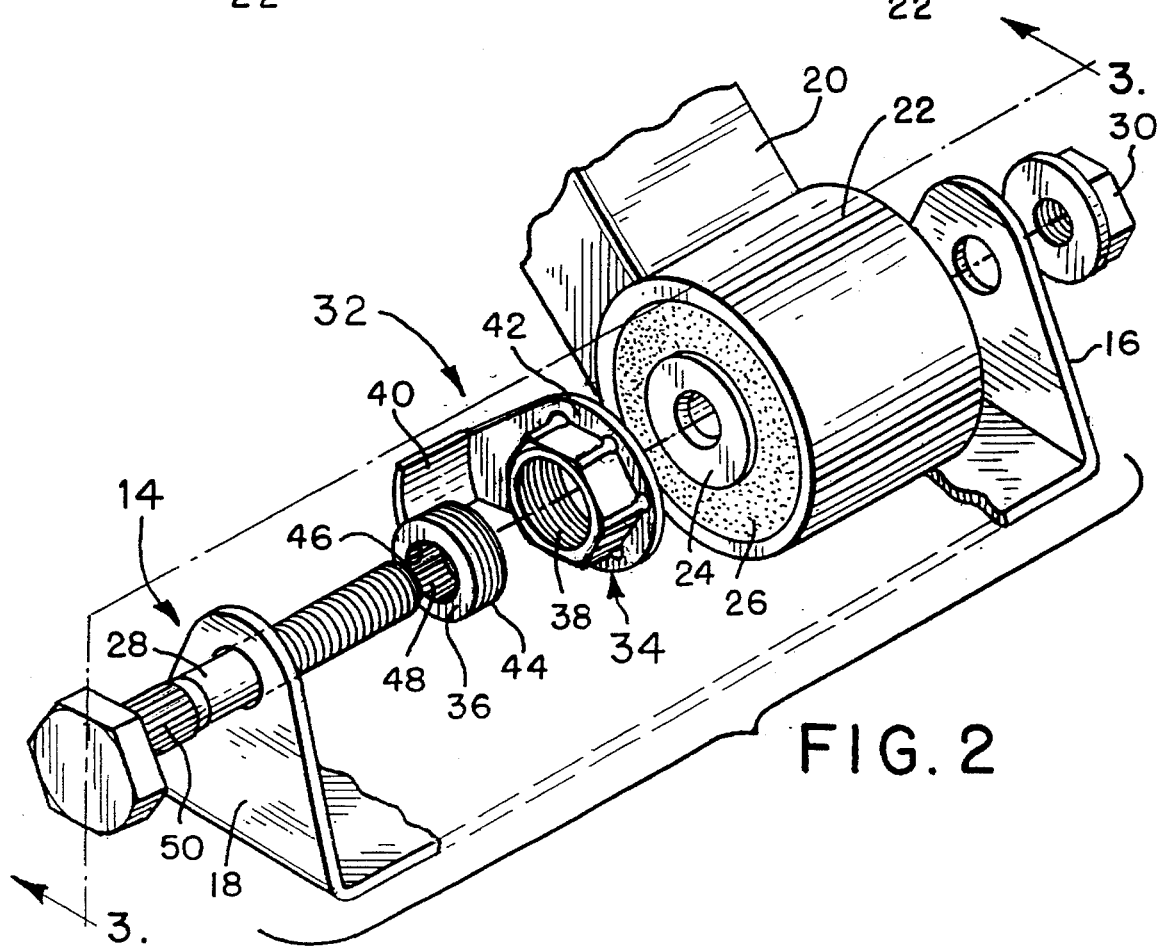

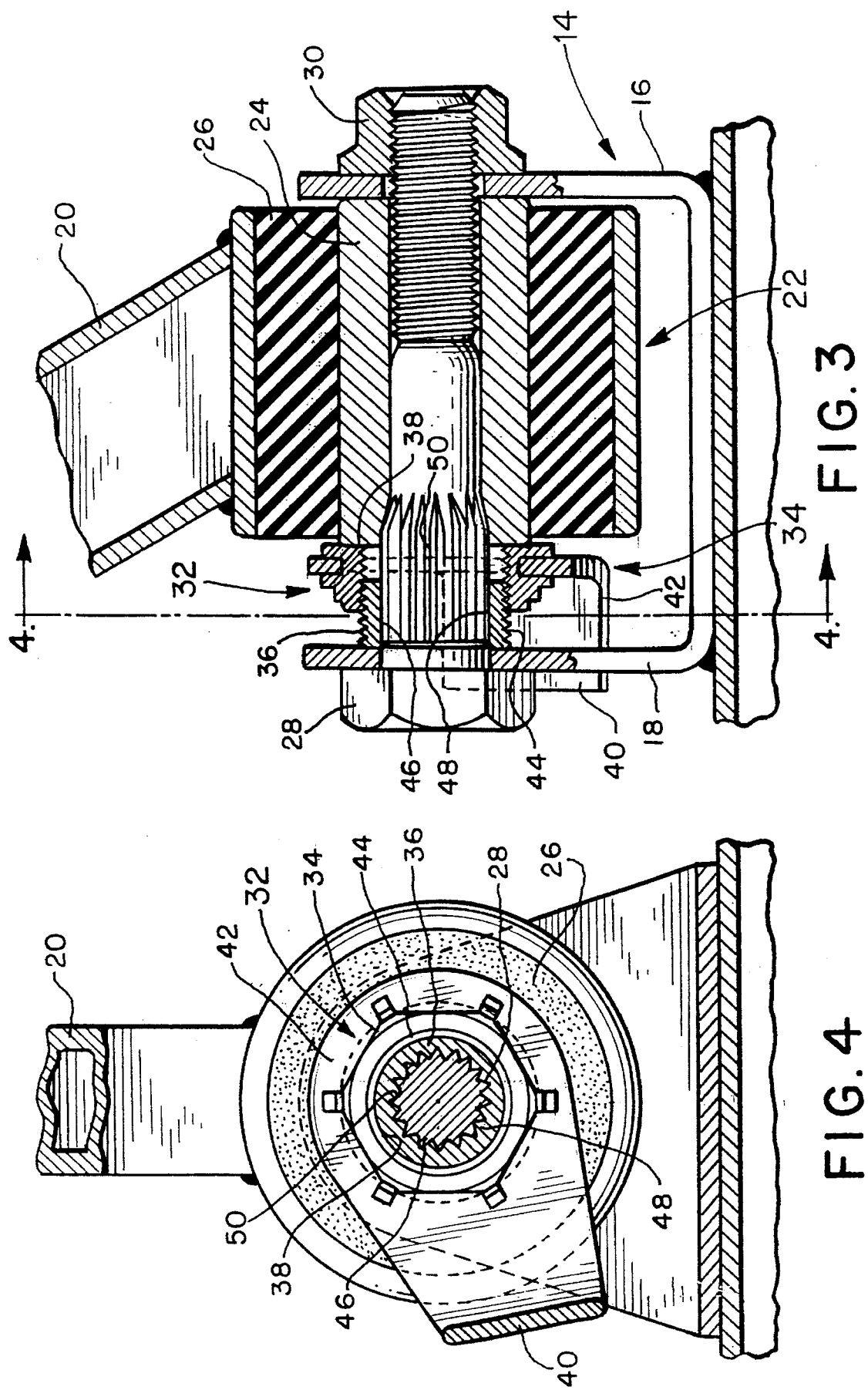

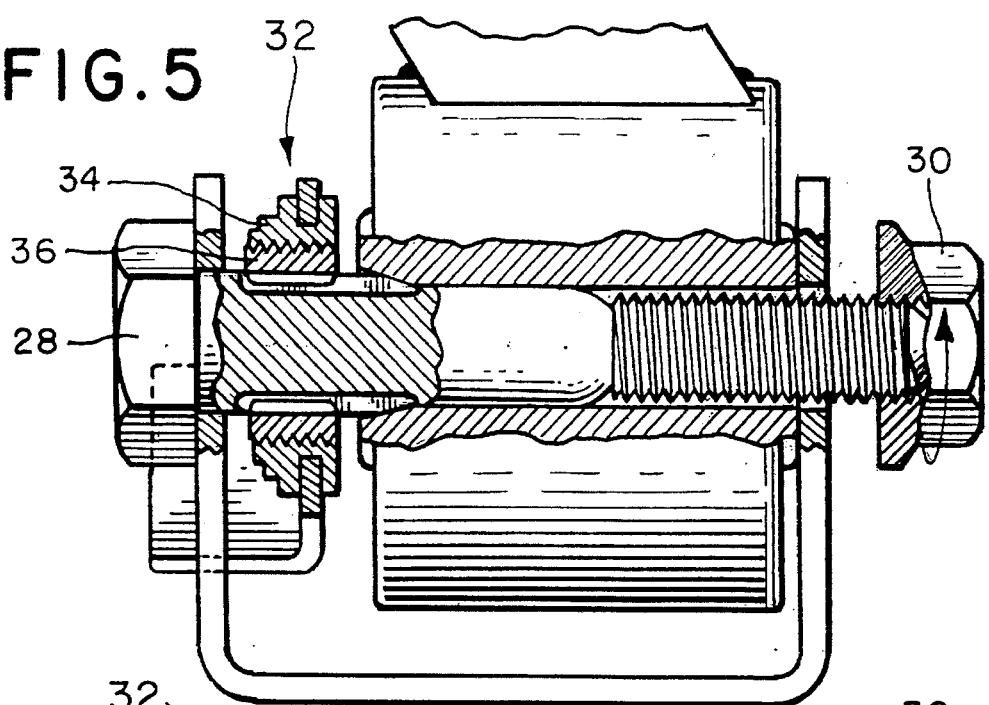
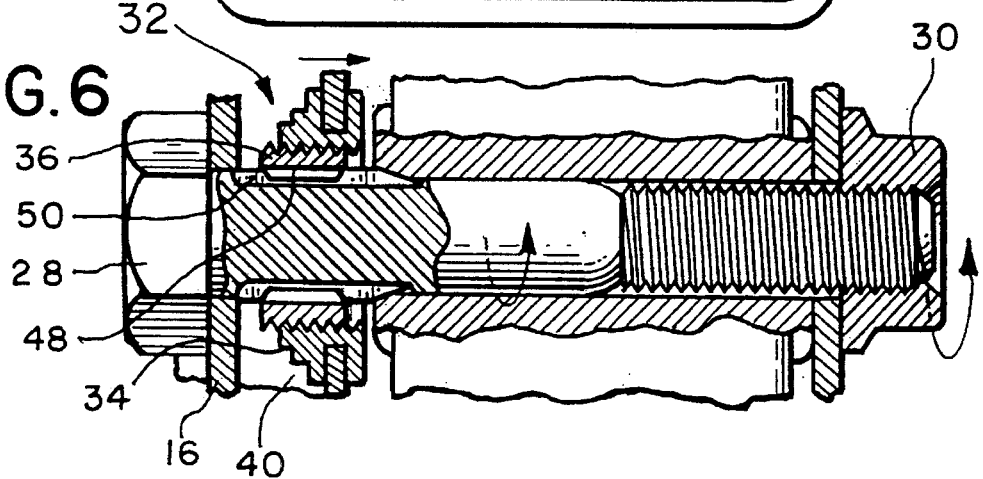
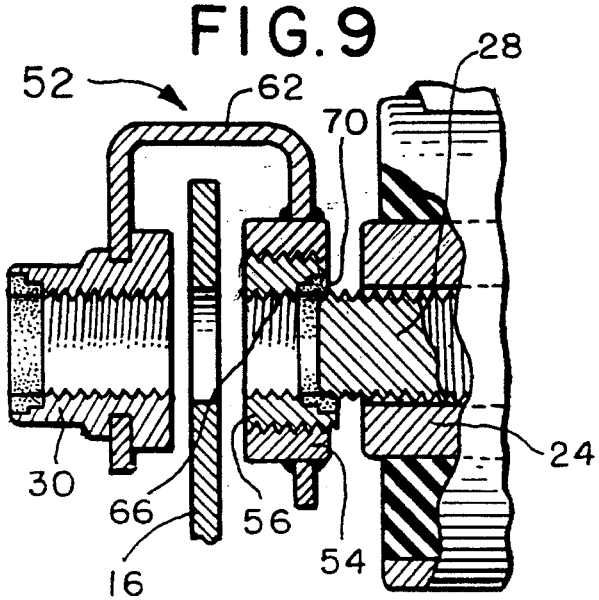
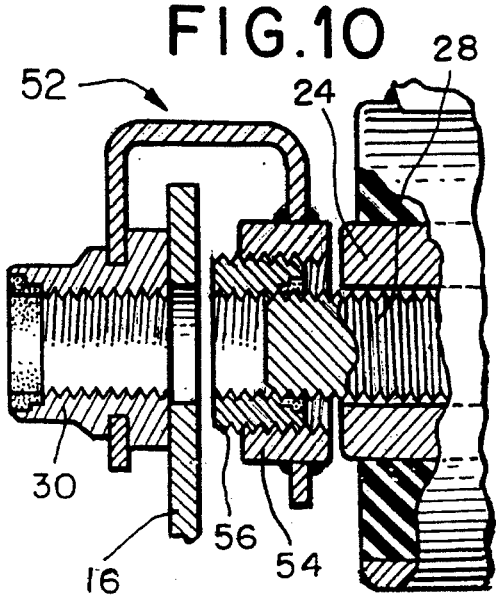

SELF-ADJUSTING SHIM

BACKGROUND OF THE INVENTION

This invention relates to a self-adjusting shim that automatically adjusts its thickness during installation.

A variety of assembly operations require that a shim be installed around a bolt to fill a gap in a workpiece before the bolt is secured in place. For example, in the assembly of automotive suspension systems it is often necessary to install one or more shims adjacent to the control arm bushing of a control arm in order to fit the control arm bushing to the chassis rail clevis. Conventionally, this has been done by manually assembling a shim of the proper thickness with the control arm bushing, and then tightening the nut and bolt assembly that holds the control arm bushing and the shim in place.

This prior art approach requires that the person assembling the suspension system must take time for a separate shimming operation. It would be of considerable value in the automotive industry and elsewhere if it were possible to eliminate the need for such a separate shimming operation.

SUMMARY OF THE INVENTION

According to this invention a self-adjusting shim is providing comprising an outer element and an inner element. The outer element comprises a threaded internal bore and an anti-rotation portion configured to limit rotation of the outer element. The inner element comprises a threaded outer surface and an inner opening. The threaded outer surface is received in the internal threaded bore such that relative rotation between the inner and outer elements results in relative axial movement therebetween. The inner opening comprises a torque transmitting feature directed radially inwardly to couple the inner element to a bolt received in the inner opening. Alternately, the torque transmitting feature can be included in the bolt rather than the inner element.

As explained below, the self-adjusting shim of this invention can be configured such that the operator is not required to take any steps other than placing the shim on the bolt in order to obtain a properly shimmed assembly.

BRIEF DESCRIPTION OF THE DRAWINGS

FIG. 1 is a top view of a control arm assembly that incorporates a first preferred embodiment of this invention.

FIG. 2 is an exploded perspective view of the embodiment of FIG. 1.

FIG. 3 is a cross-sectional view taken along line 3—3 of FIG. 2 showing the adjustable shim in the fully extended position.

FIG. 4 is a cross-sectional view taken along line 4—4 of FIG. 3.

FIG. 5 is a cross-sectional view corresponding to FIG. 3 showing the shim in a fully collapsed position.

FIG. 6 is a view corresponding to FIG. 5, showing the shim in a partly extended position.

FIG. 9 is a fragmentary cross-sectional view corresponding to FIG. 8 showing the shim in a fully collapsed position.

FIG. 10 is a fragmentary cross-sectional view corresponding to FIG. 9 showing the shim in an intermediate stage of extension.

DETAILED DESCRIPTION OF THE PRESENTLY PREFERRED EMBODIMENTS

Figure 7:
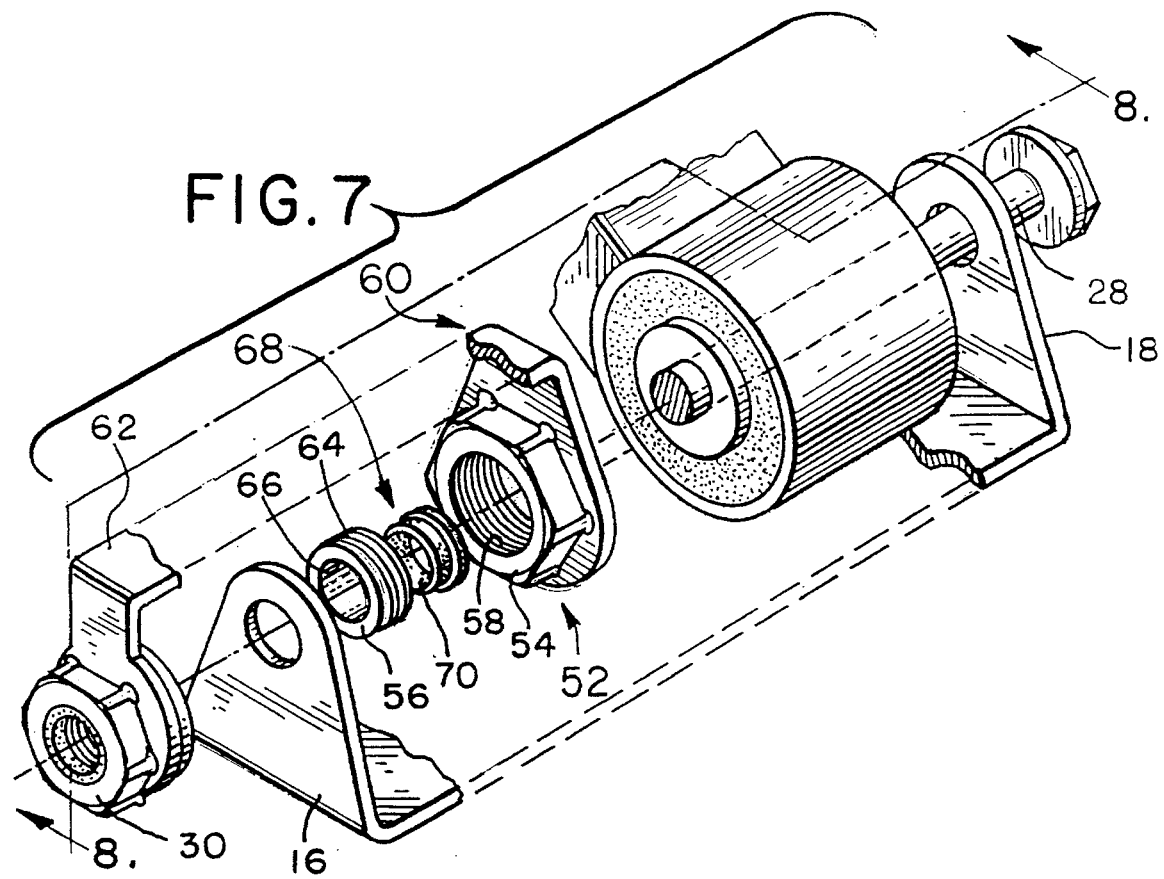
FIG. 7 is an exploded perspective view of a second preferred embodiment of this invention.

The self-adjusting shims described below have been adapted for use in an automotive suspension system, and FIG. 1 shows components of one such system.

As shown in FIG. 1, an automotive suspension system 10 includes a chassis rail 12 which rigidly supports two clevises 14. Each clevis 14 includes first and second apertured plates 16, 18 which are rigidly held in a fixed position on the chassis rail 12.

The suspension system 10 also includes a control arm 20 which in this case is a lower control arm having two collinear control arm bushings 22. Each of the bushings 22 comprises a central sleeve 24 that is resiliently held in position with respect to the control arm 20 by an elastomeric annulus 26 (FIG. 2).

Each control arm bushing 22 is secured in position in the respective clevis 14 by a bolt 28 and a nut 30. Because of manufacturing tolerances, in at least some applications it has been conventional to provide a shim between one end of one of the control arm bushings 22 and the adjacent apertured plate 16, 18.

The foregoing features of the automotive suspension system 10 are conventional, and they have been described in order to clarify one application for the adjustable shim of this invention.

FIGS. 2–4 show various views of a first preferred embodiment 32 of the self-adjusting shim of this invention. The shim 32 includes an outer element 34 and an inner element 36. The outer element 34 defines a threaded internal bore 38 and an anti-rotation portion 40. In this embodiment the threaded internal bore 38 is formed in a hex nut which is staked in place on a projecting tab 42. This projecting tab 42 is formed of sheet metal, and it acts as the anti-rotation portion 40. The outer end of the projecting tab extends at right angles to the body of the tab 42 to engage one of the apertured plates 16, 18 as described below.

The inner element 36 in this embodiment is shaped as a sleeve that defines a threaded outer surface 44. The threaded outer surface 44 is configured to mate with the threaded internal bore 38 such that relative rotation between the inner and outer elements 36, 34 results in relative axial movement therebetween.

The inner element 36 also defines an inner opening 46 which is concentric with the threaded outer surface 44. This inner opening 46 defines a torque transmitting feature 48 which in this embodiment is an out-of-round surface that is shaped to mate with a set of splines 50 on the bolt 28. This arrangement allows the inner element 36 to move axially with respect to the bolt 28, while the torque transmitting feature 48 transmits torque from the bolt 28 to the inner element 36. In this way the inner element 36 is caused to rotate in unison with the bolt 28.

The self-adjusting shim 32 has been designed for an application where the nut 30 is rotated in order to secure the control arm bushing 22 in the clevis 14. FIGS. 5, 6, and 3 illustrate successive stages in the operation of the self-adjusting shim 32. FIG. 5 shows an initial stage of assembly in which the inner element 36 is completely received within the outer element 34 and the nut 30 is in an early stage of assembly on the bolt 28. At this point the nut 30 rotates freely on the bolt 28 until a locking feature (not shown) on the nut 30 engages the threads of the bolt 28. Such locking features are conventional, and can be formed in many ways. For example, the nut 30 can be provided with a nylon insert (not shown) positioned to engage the threads of the bolt 28, or the threads of the nut 30 can be deformed so as to engage the threads of the bolt 28 frictionally.

When the locking feature of the nut 30 engages the bolt 28, continued rotation of the nut 30 causes the bolt 28 to rotate. As shown in FIG. 6, rotation of the bolt 28 causes the inner element 36 to rotate with respect to the outer element 34. This is because the inner element 36 is coupled for rotation to the bolt 28 by the splines 50 and the torque transmitting feature 48. The outer element 34 is prevented from unrestricted rotation by the anti-rotation portion 40. In particular, the tab contacts the adjacent apertured plate 16 to prevent further rotation of the outer element 34.

As the nut 30 rotates the bolt 28 and the inner element 36 rotates with respect to the outer element 34, the inner element 36 is caused to translate axially with respect to the outer element 34. This causes the inner element 36 to move partially out of the outer element 34, thereby increasing the effective thickness of the self-adjusting shim 32.

The inner element 36 continues to move axially outwardly with respect to the outer element 34 until the self-adjusting shim 32 completely fills the gap between the apertured plate 16 and the sleeve 24 as shown in FIG. 3. When this occurs, the self-adjusting shim 32 is prevented from increasing further in thickness, and the inner element 36 and the bolt 28 are prevented from further rotation. Continued rotation of the nut 30 causes the nut 30 to seat completely on the bolt 28, thereby completing assembly. It should be noted that during the entire assembly procedure discussed above, the operator is only required to rotate the nut 30. The self-adjusting shim 32 shims the gap between the control arm bushing 22 and the apertured plate 16 without any operator intervention of any sort.

As described above, the self-adjusting shim 32 is adapted for applications where the nut 30 is rotated in order to complete assembly of the control arm bushing 22 in the clevis 14. There are other applications where the nut is prevented from rotation and it is the bolt that is rotated to complete assembly. FIGS. 7–10 relate to a second preferred embodiment of the self-adjusting shim of this invention, that has been particularly adapted for such applications.

As shown in FIG. 7, a self-adjusting shim 52 includes an outer element 54 and an inner element 56. The outer element 54 defines a threaded internal bore 58 and an anti-rotation portion 60. In this embodiment, the anti-rotation portion 60 comprises a tab 62 that is interconnected between the outer element 54 and the nut 30 such that the apertured plate 16 is positioned therebetween.

The inner element 56 defines a threaded outer surface 64 and an inner opening 66. The inner opening 66 receives the bolt 28, and the inner opening 66 defines a torque transmitting feature 68. In this embodiment, the torque transmitting feature 68 comprises an annular plastic ring 70 that is mounted in the inner element 56 to extend into the inner opening 66 to engage the bolt 28 frictionally.

The self-adjusting shim 52 operates in a similar manner to the self-adjusting shim 32 described above. FIG. 9 shows the self-adjusting shim 52 during an initial stage of assembly with the inner element 56 telescoped entirely within the outer element 54. As the bolt 28 is rotated and inserted into the inner opening 66, the projecting element 70 frictionally engages the end of the bolt 28 such that rotation of the bolt 28 causes relative rotation of the inner element 56 with respect to the outer element 54. This relative rotation causes the inner element 56 to move axially with respect to the outer element 54 as shown in FIG. 10 until the gap between the sleeve 24 and the apertured plate 16 is completely filled by the self-adjusting shim 52. During this stage of assembly, the tab 62 engages the apertured plate 16 so as to prevent unrestricted rotation of the outer element 54 or the nut 30.

Figure 8:
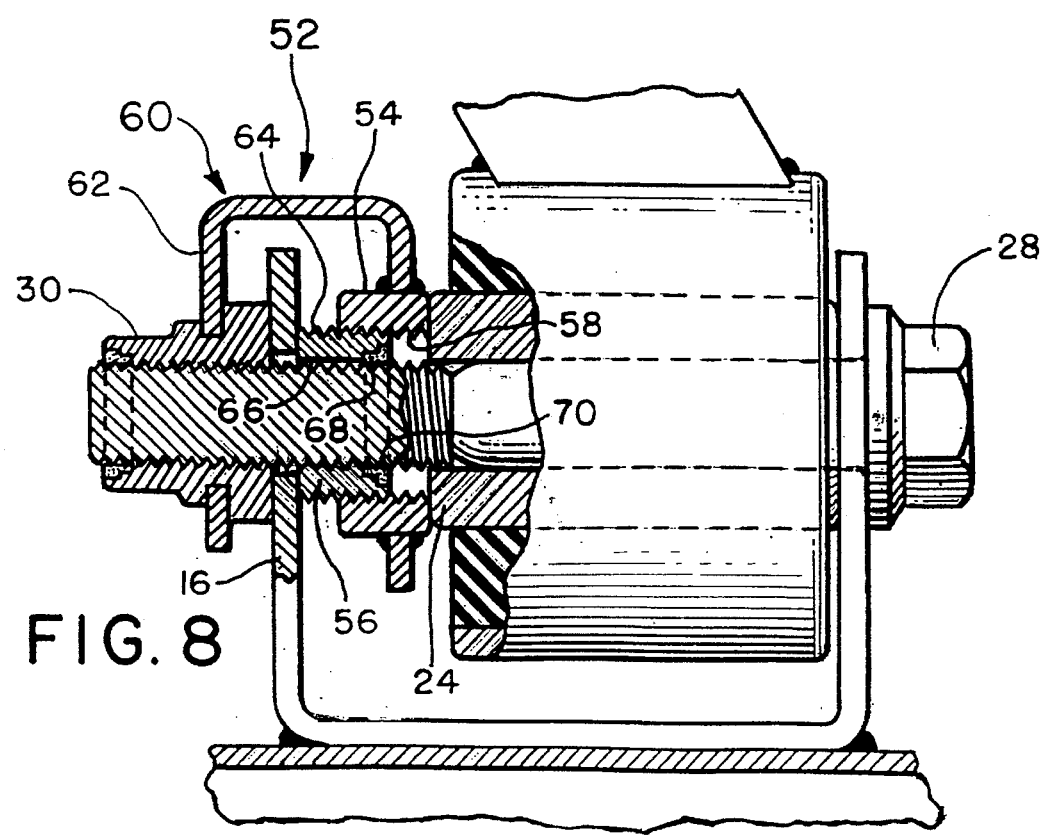
FIG. 8 is a cross-sectional view taken along line 8—8 of FIG. 7 showing the adjustable shim in the fully extended position.

Once the self-adjusting shim 52 has been expanded to completely fill the gap between the sleeve 24 and the plate 16, continued rotation of the bolt 28 causes it to engage the nut 30 (FIG. 8). The tab 62 prevents unrestricted rotation of the nut 30, and continued rotation of the bolt 28 completely seats the bolt 28 in the nut 30, thereby completing assembly.

The self-adjusting shim 52 provides a shim of the required thickness automatically, without any separate shimming operation on the part of the operator. In this case, all that is required of the operator is that the bolt 28 be rotated and advanced until the shim 52 has filled the gap between the plate 16 and the sleeve 24, and the bolt 28 has been seated properly in the nut 30.

Of course, it should be understood that a wide range of changes and modifications can be made to the preferred embodiments described above. The torque transmitting feature 48, 68 can be formed in other ways. For example, the bolt can be provided with an out-of-round surface other than a spline, and the inner opening 56 can be provided with a mating out-of-round surface. For example, the out-of-round surface can be hex-shaped. Additionally, the torque transmitting feature can be mounted on the bolt rather than the inner element, and threads can be used if desired. It is not required in all applications that there be axial movement between the inner element and the bolt, and if desired, the required axial movement of the shim can be of the outer element with respect to the inner element. Additionally, many approaches can be used for the anti-rotation portion 40, 60. For example, the outer element 34, 54 can be coupled to the clevis 14, either permanently or by means of lugs on the plate 16 or the outer element 34, 54. Of course proportions, configurations, shapes, sizes and materials can all be adapted as appropriate for the particular application.

It is therefore intended that the foregoing detailed description be regarded as illustrative rather than limiting, and that it be understood that it is the following claims, including all equivalents, that are intended to define the scope of this invention.

I claim:

1. A self-adjusting shim comprising:

an outer element comprising a threaded internal bore and an anti-rotation portion configured to limit rotation of the outer element;

an inner element comprising a threaded outer surface and an inner opening, said threaded outer surface received in the threaded internal bore such that relative rotation between the inner and outer elements results in relative axial movement therebetween, said inner opening comprising a torque-transmitting feature directed radially inwardly;

said outer element forming a first shim surface and said inner element forming a second shim surface.

2. The invention of claim 1 wherein the torque-transmitting feature accommodates relative axial movement between the inner element and a bolt received in the inner opening.

3. The invention of claim 2 wherein the inner element remains free to move axially along the bolt during adjustment of the self-adjusting shim.

4. The invention of claim 1 wherein the anti-rotation portion comprises a projecting tab secured to the outer element.

5. The invention of claim 1 wherein the torque-transmitting feature comprises an out-of-round surface on the inner opening.

6. The invention of claim 1 wherein the torque-transmitting feature comprises an inwardly projecting element mounted to the inner element to extend into the inner opening.

7. In combination with a bolt and nut assembly, a self-adjusting shim comprising:

an outer element comprising a threaded internal bore and an anti-rotation portion configured to limit rotation of the outer element;

an inner element comprising a threaded outer surface and an inner opening, said threaded outer surface received in the threaded internal bore such that relative rotation between the inner and outer elements results in relative axial movement therebetween;

at least one of said bolt and said inner element comprising a torque-transmitting feature coupling the bolt to the inner element;

said outer element forming a first shim surface and said inner element forming a second shim surface.

8. The invention of claim 7 wherein said torque-transmitting feature accommodates relative axial movement between the bolt and the inner element, and wherein said inner element remains free to move axially along the bolt during adjustment of the self-adjusting shim.

9. The invention of claim 7 wherein the nut and the outer element are axially spaced along the bolt to receive an apertured element therebetween, and wherein the nut and the outer element are coupled together to rotate in unison.

10. The invention of claim 7 wherein the anti-rotation portion comprises a projecting tab secured to the outer element.

11. The invention of claim 7 wherein the torque-transmitting feature comprises a set of splines on the bolt and a mating out-of-round surface on the inner opening.

12. The invention of claim 7 wherein the torque-transmitting feature comprises an out-of-round surface on the bolt and a mating out-of-round surface on the inner opening.

13. The invention of claim 7 wherein the torque-transmitting feature comprises an inwardly-projecting element mounted to the inner element to extend into the inner opening to engage the bolt.

14. In an automotive suspension system of the type comprising a clevis comprising first and second apertured plates, a control arm bushing disposed between the plates, a bolt passing through the plates and the control arm bushing and comprising a bolt head outside the first plate, and a nut mounted on the bolt outside the second plate, the improvement comprising:

a self-adjusting shim mounted on the bolt between one of the plates and the control arm bushing, said shim comprising an inner element and an outer element;

said inner element comprising an inner opening that slideably receives the bolt and a threaded outer surface generally concentric with the inner opening, said inner opening configured to engage the bolt to transmit torque therebetween such that rotation of the bolt tends to rotate the inner element;

said outer element comprising a threaded internal bore that engages the threaded outer surface such that the inner element is received at least partly in the outer element; and an anti-rotation feature on the outer element that restricts rotation of the outer element relative to one of the clevis, the nut, and the bolt;

said outer element forming a first shim surface and said inner element forming a second shim surface.

15. The invention of claim 14 wherein said inner element remains free to move axially along the bolt during adjustment of the self-adjusting shim.

16. The invention of claim 14 wherein the bolt comprises an array of splines extending under the self-adjusting shim, and wherein the inner opening is shaped to mate with the splines.

17. The invention of claim 14 wherein the bolt comprises a first out-of-round surface extending under the self-adjusting shim, and wherein the inner opening comprises a second out-of-round surface configured to mate with the first out-of-round surface.

18. The invention of claim 14 wherein the inner element comprises an inwardly-projecting element extending into the inner opening to engage the bolt.

19. The invention of claim 14 wherein the anti-rotation feature comprises a projecting tab secured to the outer element to engage said one of the plates.

20. The invention of claim 19 wherein the projecting tab is also secured to the nut.

21. A method for shimming a gap between first and second elements, said method comprising the following steps:

(a) providing a self-adjusting shim comprising:

an outer element comprising a threaded internal bore and an anti-rotation portion configured to limit rotation of the outer element;

an inner element comprising a threaded outer surface and an inner opening, said threaded outer surface received in the threaded internal bore such that relative rotation between the inner and outer elements results in relative axial movement therebetween, said inner opening comprising a torque-transmitting feature directed radially inwardly;

(b) positioning the self-adjusting shim on a fastening element between the first and second elements, said torque-transmitting feature accommodating relative axial movement between the inner element and the fastening element; and (c) rotating one of the inner and outer elements with respect to the other to cause the self-adjusting shim to increase in effective width and thereby to shim the gap between the first and second elements, said inner element moving axially along the fastening element during the rotating step.

* * * * *